United States Patent [19]

Silk

[11] Patent Number: 4,923,343
[45] Date of Patent: May 8, 1990

[54] MACHINE TOOL

[75] Inventor: George R. Silk, Sandiacre, England

[73] Assignee: Silk Engineering (Derby) Limited, England

[21] Appl. No.: 245,321

[22] Filed: Sep. 16, 1988

[30] Foreign Application Priority Data

Sep. 18, 1987 [GB] United Kingdom ............... 8721935
Jan. 28, 1988 [GB] United Kingdom ............... 8801914

[51] Int. Cl.⁵ ............................ B23C 1/20; B23C 3/05
[52] U.S. Cl. ............................... 409/179; 51/241 A; 408/83.5; 409/175
[58] Field of Search ............... 408/79, 83.5; 409/175, 409/179, 199, 200; 51/119, 120, 241 S, 241 A, 241 B; 82/1.4, 1.5

[56] References Cited

U.S. PATENT DOCUMENTS

| | | | |
|---|---|---|---|
| 2,304,405 | 12/1942 | Green | 409/179 |
| 3,069,819 | 12/1962 | Gilmore | 409/175 X |
| 4,519,169 | 5/1985 | Smith | 51/241 S |

FOREIGN PATENT DOCUMENTS

| | | |
|---|---|---|
| 407186 | 3/1934 | United Kingdom . |
| 945497 | 1/1964 | United Kingdom . |
| 960897 | 6/1964 | United Kingdom . |
| 1539159 | 1/1979 | United Kingdom . |

Primary Examiner—Steven C. Bishop
Attorney, Agent, or Firm—Oliff & Berridge

[57] ABSTRACT

A machine tool (10,100) particularly a portable machine tool for use in machining or operating on surfaces remote from the drive of the machine tool comprises a base (34,102) attached to a work piece (14,114), a carriage (36,128), tool support means (14,126), and an operating tool (64,144) having a cutting head (80,136). The carriage and operating tool are driven and the axes and carriage of the operating tool are offset so that a cutting tool on the operating tool describes an epicyclic path to mill at least one surface on the work piece.

18 Claims, 10 Drawing Sheets

MACHINE TOOL

SUMMARY AND BACKGROUND OF THE INVENTION

This invention relates to machine tools. In particular, the invention relates to a machine tool which is portable so that it can be easily transported to the work piece on which operations are to be performed, which can perform a range of operations on the work piece and which can perform these operations at locations remote from the drive of the machine tool.

In many industrial installations and power stations the work piece may form a part of a larger piece of equipment and cannot be removed so that any machining or other operations have to be performed on site. It is not uncommon that the parts of the work piece upon which operations are to be performed are relatively inaccessible. Further, the operations required on the work piece may comprise not only the removal of material by a suitable cutting tool or tools, but also the application of material to a surface in order to restore the surface to a previous size, the built up material then requiring to be formed to the desired size and surface finish.

The present invention therefore seeks to provide a machine tool which is sufficiently portable so that it can be set up on site, which can accommodate a variety of tools and which can operate on surfaces of a work piece remote from the access to that work surface.

Accordingly, the present invention provides a machine tool, the machine tool comprising tool support means, a rotatably driveable carriage to which the tool support means is secured, and a base on which the carriage is supported for rotation, the base being securable to a work piece upon which operations are to be performed, the tool support means being capable of receiving at least two tools for performing operations on the work piece, means being provided to offset the axis of rotation of at least one of said tools from the axis of the surface upon which operations are to be performed.

The tool support means may comprise at least two spaced apart bearing surfaces.

In one arrangement, three bearing surfaces may be provided, one surface being on the carriage, and two surfaces being on a hollow shaft forming part of an intermediate support structure to which the base is secured and which itself is secured to the work piece.

The tool may include a cutting tool mounted on a driveable spindle, the spindle being eccentrically mounted on a shaft which is located in the tool support means.

The shaft can be securable to the rotatable carriage and the shaft can be attached to a drive housing having height adjustment means to position the shaft vertically with respect to the carriage and the tool support means.

The height adjustment means can comprise a spindle rotatably mounted on the carriage engaging a threaded portion of the drive housing.

The cutting tool can comprise a milling cutter.

The other one of said at least two tools can comprise a welding head arranged to deposit material upon a surface already prepared by the milling cutter.

The machine tool can include a cutter head having at least one adjustable tool, the adjustment of which can be remotely controlled.

A further feature of the present invention is the provision of means for adjusting the eccentricity of the cutter head drive shaft, so that the machine tool can mill a variety of diameters of the work piece.

Further features of the present invention can include the provision of double reverse helical gears on the drive shaft, a twin drive for the rotatable table of the machine tool, and twin bearings for the tool support means.

BRIEF DESCRIPTION OF THE DRAWINGS

The present invention will now be more particularly referred to with reference to the accompanying drawings in which.

DETAILED DESCRIPTION OF THE PREFERRED EMBODIMENTS

Figure 1:
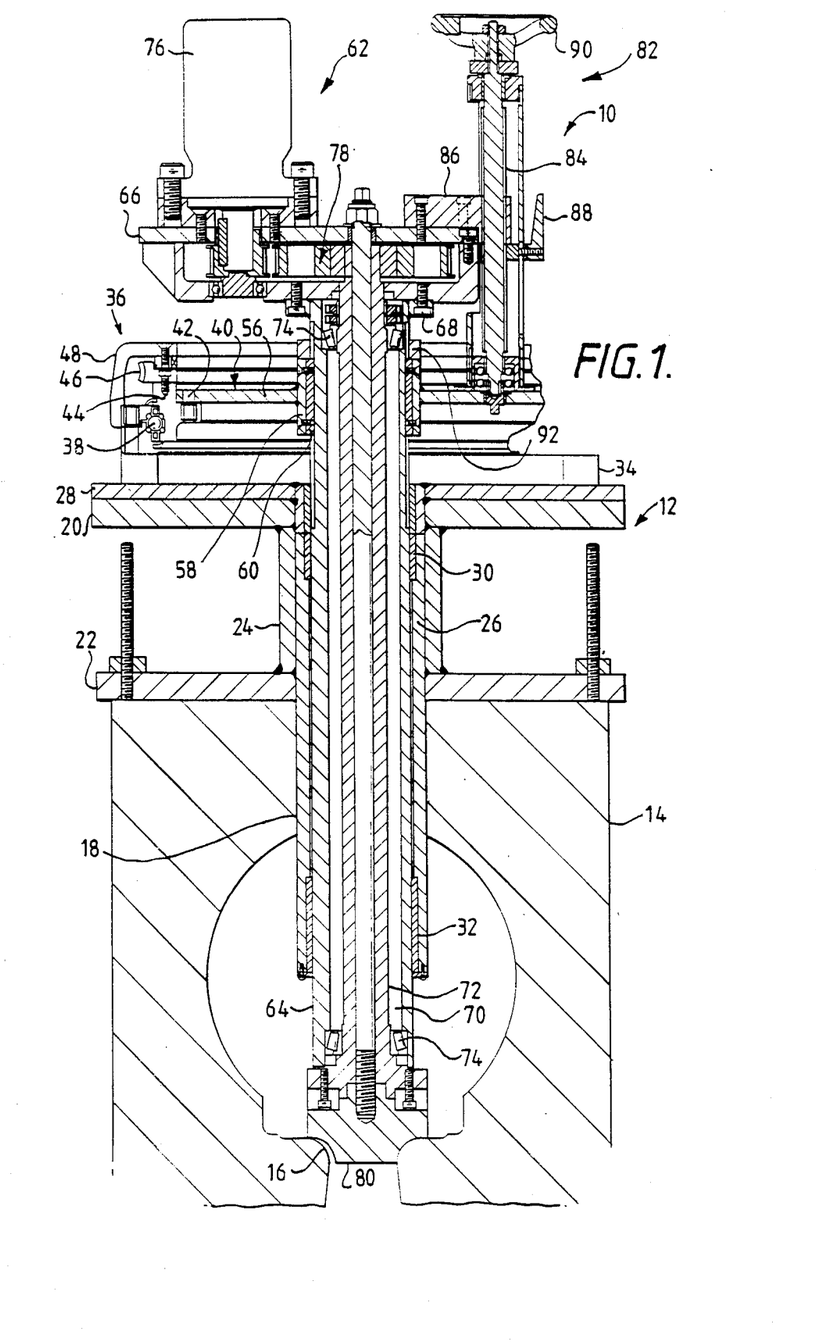
FIG. 1 is a sectional elevation of one form of machine tool according to the present invention secured to a work piece.
Figures 2, 5:
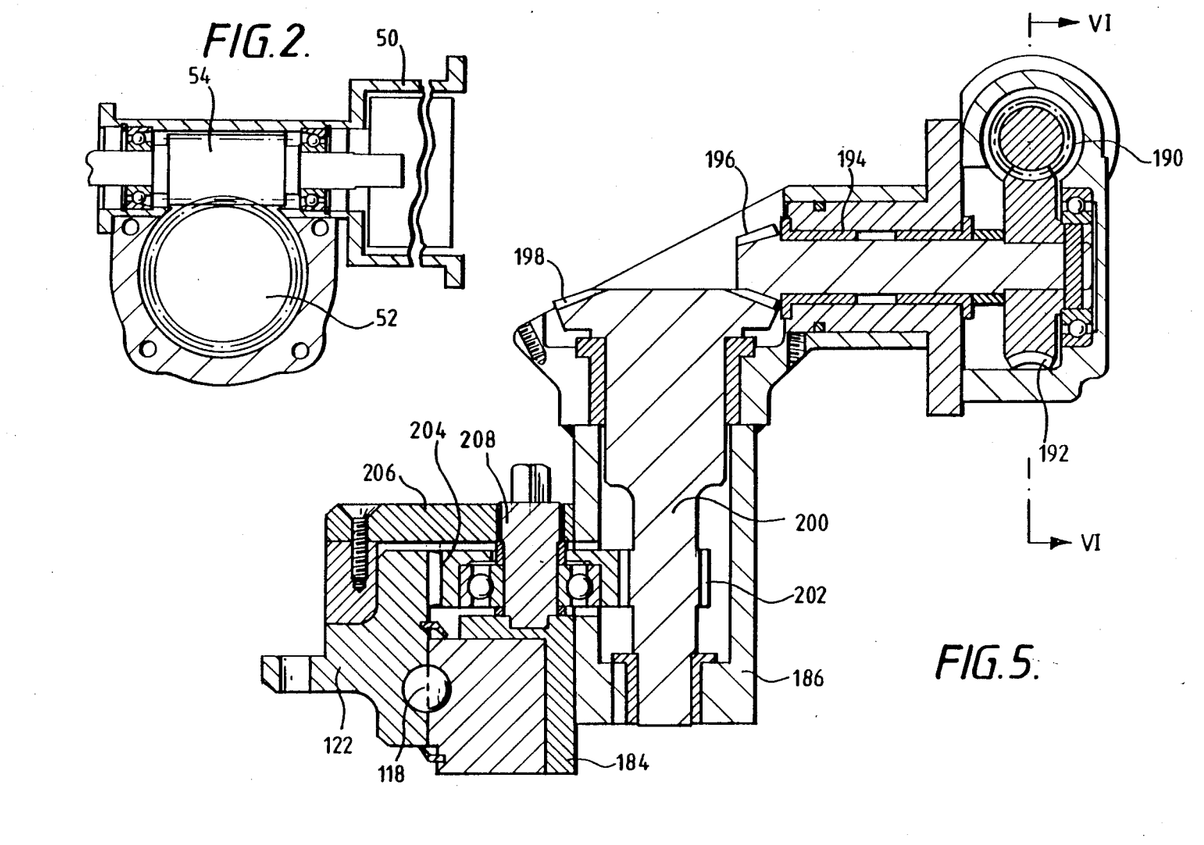
FIG. 2 is a sectional elevation of part of one of the drive mechanisms of the machine tool shown in FIG. 1.
FIG. 5 shows part of the drive for the table of the machine tool shown in FIG. 3.

Referring to FIGS. 1 and 2 of the drawings, a machine tool 10 is secured to an intermediate structure 12 which itself is secured to a work piece 14. In this case, the work piece comprises a steam chest having a valve seat 16 and a bore 18 which normally accommodates the valve support housing (not shown).

The intermediate support structure 12 comprises top and bottom plates 20 and 22 welded together by means of an outer sleeve 24. An inner sleeve 26 is welded to a plate 28 which is secured to the plate 20 and extends through the opening 18 to the interior of the steam chest 14.

An inner sleeve 26 has two spaced apart bushes 30 and 32 located at the upper and lower ends respectively of the sleeve.

The machine tool 10 has a base 34 secured to the plate 28, a rotatable carriage 36 mounted on the base by means of ball-bearings 38, and tool support means 40 secured to the carriage by means of bolts 42.

The carriage 36 includes a ring 44 to which the tool support means 40 is secured, a pinion 46 secured to the ring 44 and a cover plate 48 secured to the pinion 46. The carriage 36 is driven by means of a motor 50 (FIG. 2) which drives a pinion 52 by means of a worm 54 and the pinion 52 drives the pinion 46 via an intermediate worm gear (not shown).

The tool support means 40 comprises a plate 56 to which is welded a sleeve 58 in which is located a bearing bush 60.

In the arrangement shown, the tool support 40 supports an operating tool 62. The operating tool comprises an outer sleeve 64 secured to a drive housing 66 by means of bolts 68, the outer sleeve having an eccentric bore 70. A cutting tool spindle 72 is mounted in bearings 74 in the bore 70, and is driven by a motor 76 mounted on the drive housing via a gear transmission 78. A milling cutter 80 is secured to the end of the spindle 72.

The height of the operating tool can be adjusted by means of a mechanism 82 comprising a threaded spindle 84 rotatably mounted in a bearing in the plate 56, the threaded portion of the spindle engaging a threaded bore in a block 86 secured to the drive housing 66. The height adjustment mechanism 82 includes a depth stop 88 which moves vertically when the spindle 84 is rotated by means of a hand wheel 90 and the position of the depth stop can be adjusted relative to the length of the spindle 84.

In operation, the machine tool 10 is positioned with respect to the axis of the valve seat 16 so that when the operating tool is located in the tool support means, which in this case comprises the bearing (30, 32 and 60), the offset between the axis of the surface 16 and the bore 70 is such that when the spindle 72 is driven and the carriage 36 is also driven the cutter 80 will machine the whole of the surface 16 in an epicyclic form of motion. The operating tool is located within the tool support and the height of the cutter 80 with respect to the surface 16 is adjusted by means of the mechanism 82. Once the correct depth of cut has been set, the outer sleeve 64 can be locked to the cover 48 by means of a lock 92. The motor 76 is operated to drive the spindle 72 and the cutter 80 and the motor 50 is operated to drive the carriage 36. The cutter 80, machines the surface 16 and machining is continued until all the defects in the surface 16 such as cracks or deformations have been removed.

Figure 12:
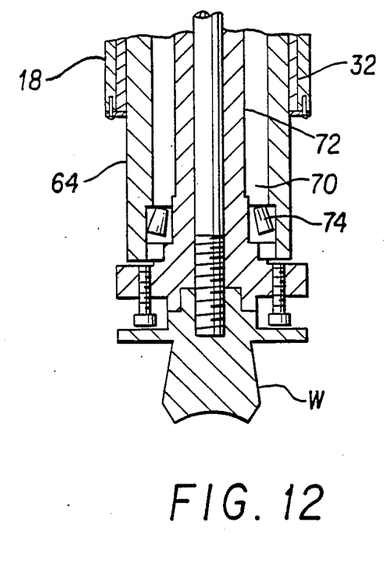
FIG. 12 shows a welding head attached to the embodiment of FIG. 1.

If too great a quantity of material has been removed in these operations, the surface (16) can be built up to its former level. This can be achieved by removing the operating tool 62 and replacing it with a welding head having an outer support sleeve which is compatible with the tool support means essentially comprising the bearings (30, 32 and 60). The weld head W (shown in FIG. 12) is driven in a similar manner to the cutter 80 and has a continuous wire feed enabling suitable material to be applied to the surface 16 in order to build up that surface to a sufficient level for a final machining operation to take place so that the valve seat is restored to its original size and position with respect to the remainder of the steam chest 14.

Once sufficient material has been deposited the weld head is removed and the operating tool 62 or a similar tool having a suitable cutter is used to machine the built up material to the correct size and surface finish required.

As well as operating tools which can remove and replace material from and onto a surface, other operating tools such as tools for applying facing materials or tools to polish a surface to a high quality finish can be inserted in the tool support, each said operating tool having an outer sleeve compatible with the three bearings without the need for the tool support, its drive mechanism and base having to be removed from the work piece.

It may not be necessary in all cases for an intermediate support 12 to be provided in which case the base 34 can be secured directly to the work piece. In such cases, it may be necessary to extend the sleeve 58 in order to provide a further bearing, which bearings in turn provide suitable support for an outer sleeve of the operating tool.

In order to provide the offset for the cutting tool 80 instead of the bore of the support sleeve 64 being eccentric, the bore in the sleeve 26 can be eccentric. Alternatively, the base can be positioned eccentrically of the axis of the work surface to be operated upon.

It will be appreciated that a machine tool according to the present invention enables a variety of operations to be performed upon surfaces which are relatively inaccessible, the machine tools themselves being portable so that they can be transported easily to and from site where the work piece to be machined is located.

It will be further appreciated that because of the arrangement of the tool support a wide range of operating tools can be inserted and removed from the tool support without the need for the removal of the tool support, its carriage and base from the work piece.

Further, because the eccentricity of the operating tool with respect to the axis of the work piece is pre-set the metal removal and material replacement is extremely accurate and does not require any complex initial setting up operation of the machine tool with respect to the work piece.

Whilst the machine tool and its operation have been described in particular in relation to the valve seat of a steam chest, the machine tool can be used in a wide range of locations and on a wide range of structures where the surface to be machined is relatively inaccessible and the operating part of the tool has to be removed from the drive of the tool.

Figure 3:
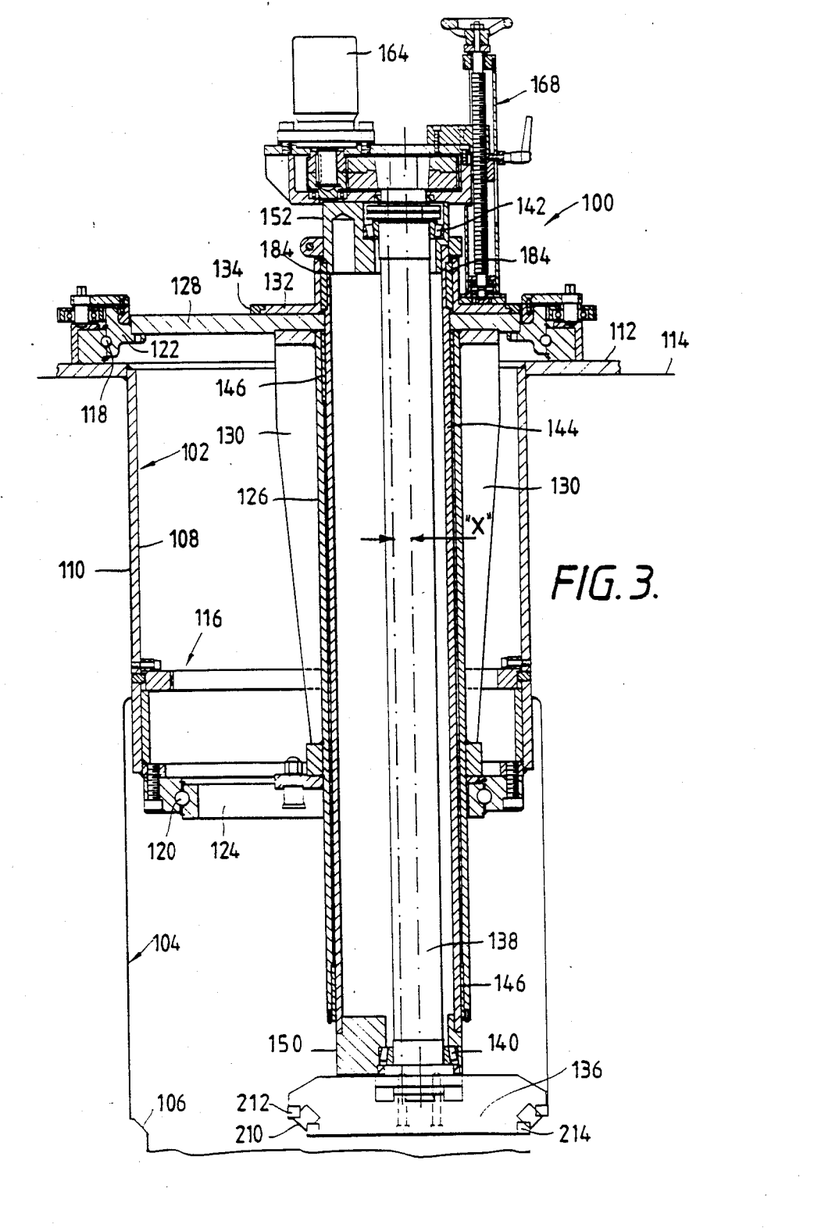
FIG. 3 shows a sectional elevation of another form of machine tool according to the present invention.
Figure 4:
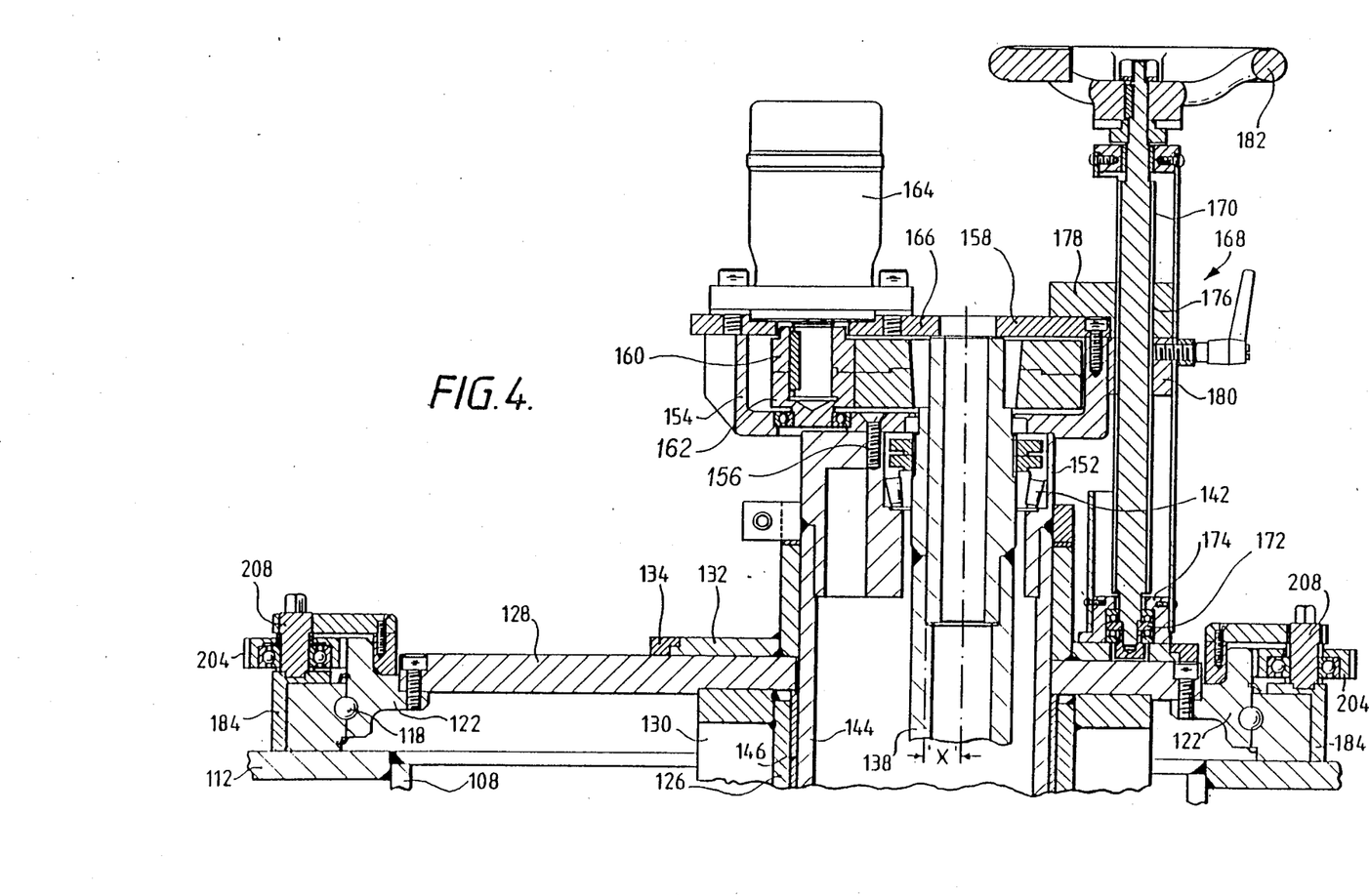
FIG. 4 is a part sectional elevation of the machine tool shown in FIG. 3.

Referring to FIGS. 3 and 4 a machine tool 100 is secured to an intermediate structure 102, which itself is secured to a work piece 104. The work piece 104 has a valve seat 106 which is required to be machined. Usually the valve seat 106 has a hard coating formed from a stellite material, and in use this coating becomes worn, cracked or partially removed. It is therefore required that the damaged coating be removed entirely, the surface of the valve seat prepared for another application of coating material, applying the coating material and then machining the coating to the required finish.

The support structure 102 comprises a sleeve 108 which fits inside a bore 110 of the work piece, and a plate 112 is welded to the upper end of the sleeve 108, the plate 112 resting upon an upper surface 114 of the work piece.

An expandable clamping mechanism 116, the construction and function of which is not a feature of the present invention, is located internally of the structure 102 in order to fix the structure 102 in relation to the work piece.

The structure 102 includes two spaced apart bearings 118 and 120, the upper bearing 118 co-operating with a driven ring 122, whilst the lower bearing 120 co-operates with a ring 124.

The machine tool 100 has tool support means including a sleeve 126 attached to the ring 124 and to a plate 128, which is secured to the driven ring 122. Ribs 130 are welded to the sleeve 126 and to the ring 124 and plate 128, in order to stiffen the tool support means.

The tool support means also includes a housing 132 which is mounted for rotation on the plate 128 in an annulus 134. The tool support means supports an operating tool comprising a cutter head 136 attached to one end of a drive shaft 138, which is mounted by means of bearings 140 and 142 in an inner sleeve 144. The inner sleeve 144 itself is mounted within the sleeve 126 in bushes 146 and 148, the axes of the sleeves 126 and 144 being coincident.

The axis of rotation of the drive shaft 138 is offset from the axes of the sleeves 126 and 130 by an amount X, by means of housings 150 and 152 secured to each end of the inner sleeve 144. The housing 152 which contains the bearing 142 for the shaft 138, is attached to a drive housing 154 by screws 156. The drive housing 154 contains a double reverse helical gear 158 keyed to the shaft 138 and mating with a corresponding gear 160 on the drive shaft 162 of the hydraulic motor 164, which is attached to a cover 166 of the housing 154.

The axial position of the shaft 138 and thus the cutter head 136 can be axially adjusted by a mechanism 168, which comprises a threaded spindle 170 rotatably mounted in a bearing 172 which is located in a housing 174 attached to the housing 132. The threaded portion of the spindle engages a threaded bore 176 in a block 178 attached to the cover plate 166. The height adjustment mechanism 168 includes a depth stop 180, which moves vertically when a spindle 170 is rotated by means of a hand wheel 182, and the position of the depth stop can be adjusted relative to the length of the spindle.

The inner sleeve 144 is secured to the housing 132 by keys 184, so that rotation of the plate 128 and housing 132 causes rotation of the sleeve 144, but permits axial movement of the inner sleeve 144 with respect to the housing 132. The housing 132 can be rotated as will be described below with reference to FIGS. 10 and 11, so that the eccentricity of the shaft 138 can be adjusted relative to the work piece.

Figure 6:
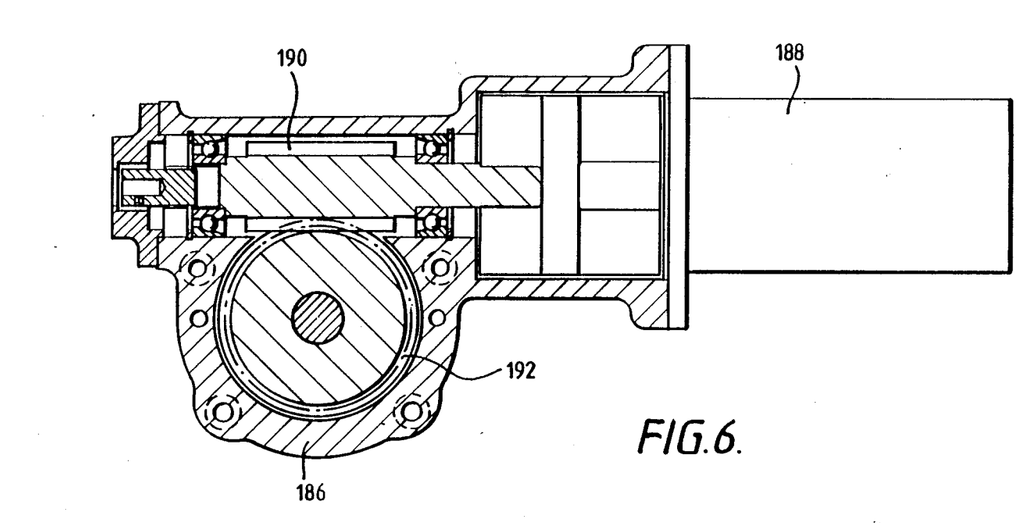
FIG. 6 is a section on line VI—VI in FIG. 5.

FIGS. 5 and 6 show a twin motor drive for the plate 128. The bearing 118 and driven ring 122 are mounted in an annular housing 184, to which are attached two transmission housings 186, only one of which is shown. An hydraulic motor 188 is attached to each housing 186 and drives the ring 122 through a worm gear 190 and a pinion 192, on a shaft 194 which has a bevel gear 196 engaging a bevel gear 198 on a shaft 200. The shaft 200 has a spur gear 202 engaging with a further spur gear 204 mounted in a bearing 206 on a shaft 208 secured to the housing 184. The spur gear 204 engages with an annular gear on the outer-face of the ring 122, so that the two motors 188 provide a smooth drive to the ring 122 and thus the plate 128 and consequently the outer and inner sleeve 126 and 144 respectively.

Referring to FIG. 3 the cutter head 136 includes a number of fixed cutting tools 210, 212 and 214. The tools 212 and 214 are used to machine the surfaces of the work piece adjacent the valve seat 106, and it is the tools 210 which are used to machine the valve seat itself. It will be clear that once the cutting tools 210, 212 and 214 are set and the eccentricity of the drive shaft 138 has been set with reference to the bore 110 of the work piece the machine tool can be essentially preset prior to being positioned within the work piece. The height adjusting mechanism 168 also having been operated so that the cutting head is at the correct depth prior to the machine tool being located within the work piece. Once the machine tool has been located and fixed within the work piece, the motor 164 which drives the cutter head and the motors 188 which drive the inner and outer sleeves via the housing 132, the plate 128 and the driven ring 122 are operated. The cutter head 136 then performs an epicyclic form of motion, and the cutting tools 210, 212 and 214 mill the surfaces 106 and the adjacent surfaces of the work piece.

However, sometimes during this milling operation particularly when the hard coating on the valve seat 106 is being removed, one or more of the cutting tools become broken, particularly one or more of the cutting tools 210 which are machining the old hard coating of the valve seat 106. In such circumstances the machine tool would normally have to be removed from the work piece, and either a new cutting head complete with cutting tools would have to be used, or the broken cutting tools would have to be removed from the existing head and replaced with new tools.

Figure 7:
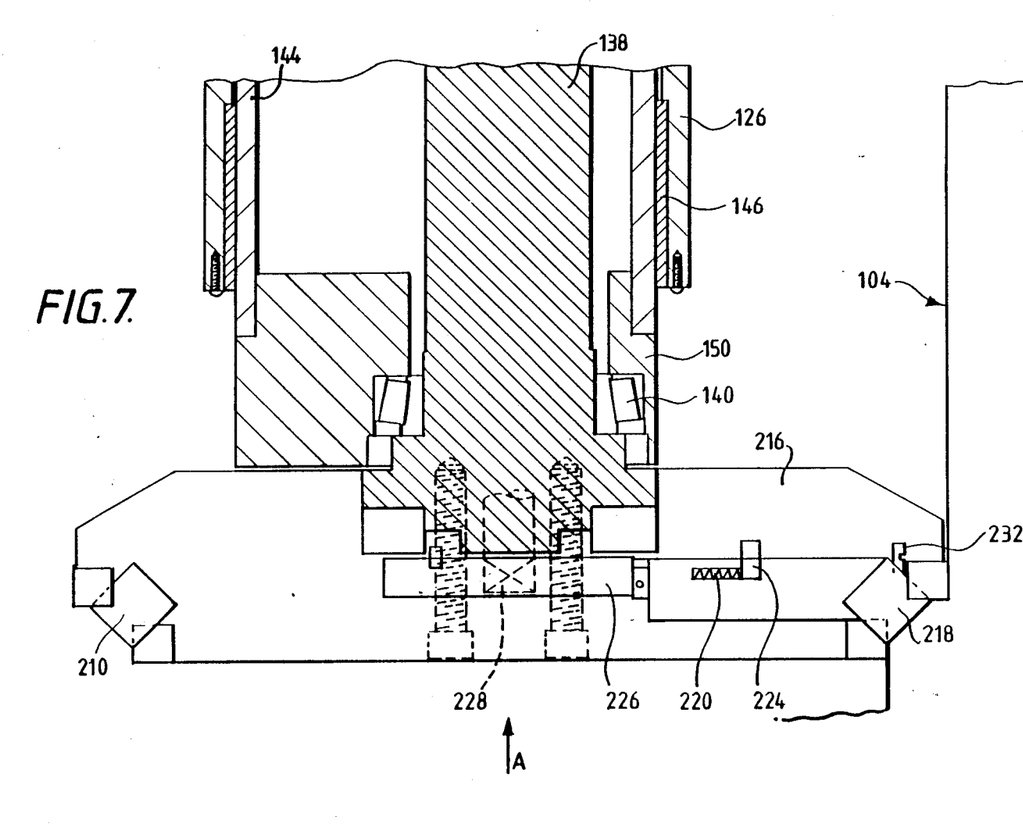
FIG. 7 shows a modified form of cutter head of the machine tool as compared to that shown in FIG. 3.
Figure 8:
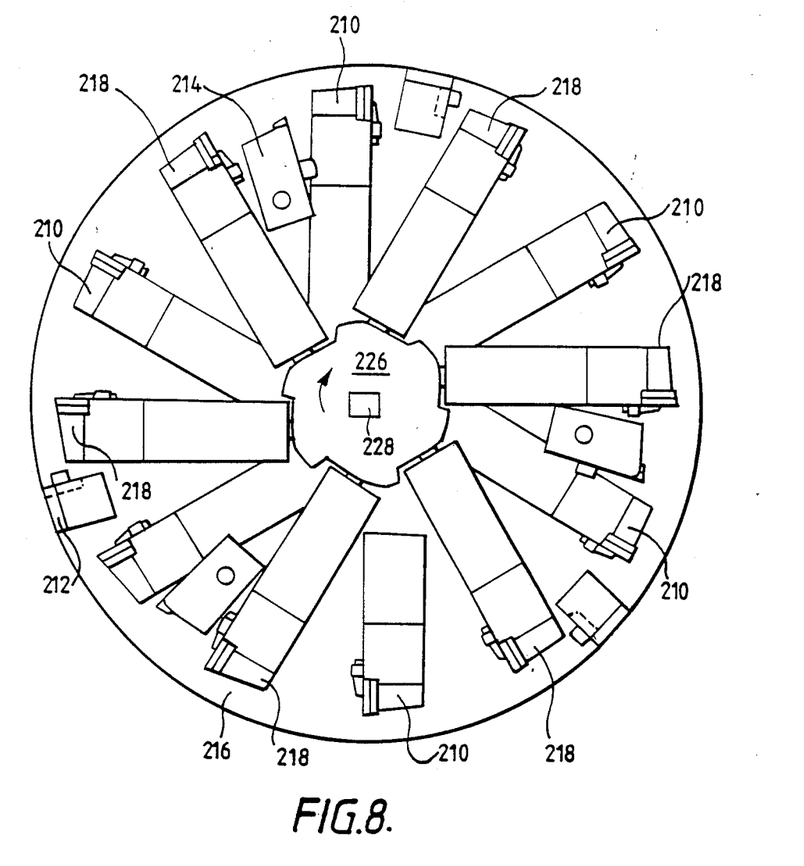
FIG. 8 is a view on arrow A in FIG. 7.
Figure 9:
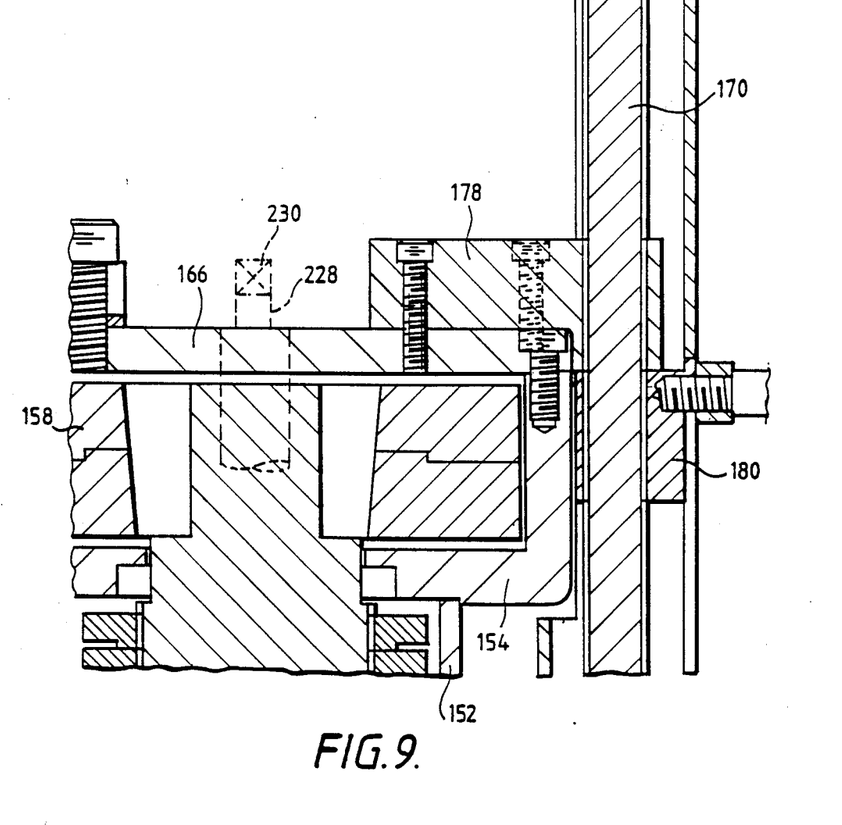
FIG. 9 is a view of a modified form of the upper end of the drive shaft of the machine tool as compared to that shown in FIG. 3.

FIGS. 7, 8 and 9 show a modified form of machine tool particularly a modified form of cutting head which enable the machine tool to continue to operate if any of the fixed cutting tools 210 become damaged.

Referring to FIG. 7 there is shown a modified form of cutting head 216 having a number of radially movable tools 218 which are urged by means of a spring 220 acting against a stop 224 into contact with the operating surface of a cam 226. The cam is keyed to a shaft 228, which passes through the centre of the shaft 138 and terminates in a square end 230 as shown in FIG. 9, so that a suitable handle or spanner can be applied to the square end to enable the cam to be rotated.

As will be seen from FIG. 8 the cutter head 216 comprises six fixed cutters 210 and six movable cutters 218. Also shown are some of the other cutters 212 and 214.

In the event of one or more of the cutting tools 210 becoming damaged, the machine operation is halted and the eccentricity of the shaft 138 with respect to the work piece is reduced, thereby withdrawing the cutting tools 210 from contact with the valve seat. The cam 226 is then rotated by means of the shaft 228 and a key attached to the square end 230, the rotation of the cam being limited by a stop (not shown). The rotation of the cam will force the cutting tools 218 outwardly against the spring load 220, until the cutting tools 218 each engage a stop 232. It is arranged that the cutting tools 218 can be advanced outwardly by some predetermined amount, for example 0.020 inches further than the cutting tools 210, so that the remaining undamaged cutting tools 210 cannot interfere with the cutting operations of the tools 218. The eccentricity of the shaft 138 with respect to the bore in the work piece, is then appropriately readjusted and machining operations can recommence.

Whilst a cutting head with a number of adjustable cutting tools has been described, it may only be necessary for one adjustable cutting tool to be provided.

Figure 10:
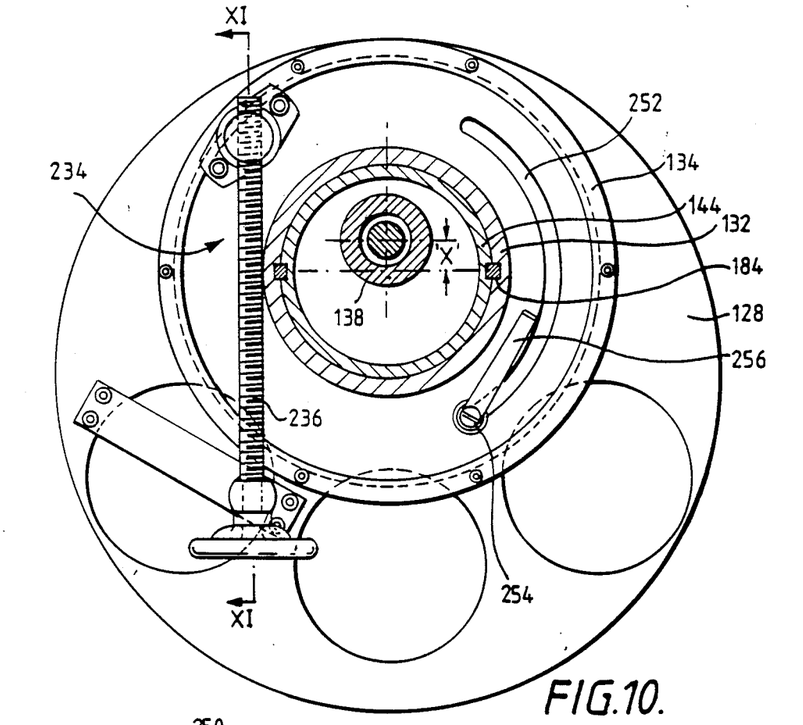
FIG. 10 is a plan view of the machine tool shown in FIG. 3 and, FIG. 11 is a section on line XI—XI in FIG. 10.
Figure 11:
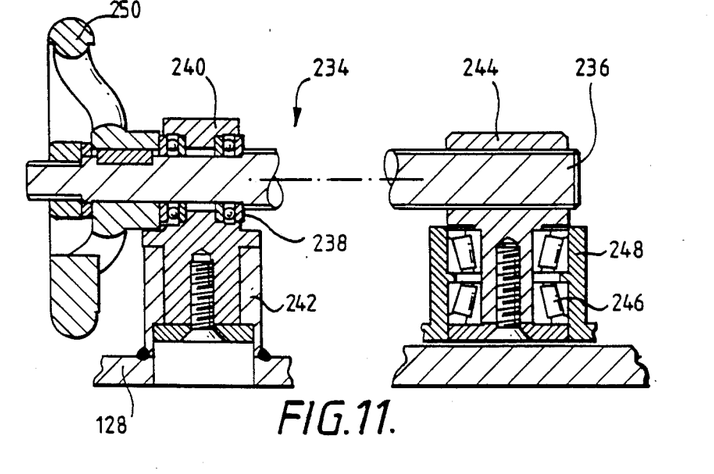

Referring now to FIGS. 10 and 11, the housing 132 is rotatable on the plate 128 in the annulus 134, and rotation of the housing 132 is effected by an operating mechanism 234. The operating mechanism comprises a lead screw 236 mounted at one end in bearing 238 in a pivot 240, the pivot being mounted in a housing 242 attached to the plate 128.

The other end of the lead screw 236 engages in a nut 244 pivoted in a bearing 246 in a housing 248, which is attached to the housing 132. A hand wheel 250 is keyed to the lead screw 236, and it will be clear that rotation of the lead screw 236 will rotate the housing 123 together with the inner sleeve 144 and thus the housings 150 and 152 in which the drive shaft 138 is supported. Thus operation of the hand wheel 250 will move the axis of the drive shaft 138 with respect to the axis of the bore 110, thereby adjusting the eccentricity of the drive shaft and thus the cutter head with respect to the work surface to be machined. The housing 132 also includes an arcuate slot 252 through which extends a threaded stud 254 attached to the plate 128. A clamping handle 256 is mounted on the stud 254, to enable the housing 132 to be securely clamped to the plate 128 once the eccentricity of the drive shaft has been set to the operating mechanism 234.

It will be apparent that a machine tool as described with reference to FIGS. 3 to 11, whilst having the essential features of the machine tool described with reference to FIGS. 1 and 2, includes a number of developments and improvements.

In particular the provision of double reverse helical gearing on the drive to the shaft 138, reduces backlash in the drive mechanism to a minimum. The provision of a twin drive to the plate 128 provides an even torque and thus a smooth drive to the plate and ultimately to the machining operation.

The provision of a twin bearing support in the form of the bearings 118 and 120 and the associated stationary and rotating structures, provide strength and stability to the machine tool in that the overhang of the cutting head 136 is reduced.

A development which increases the operating range and capability of the machine tool, resides in the provision of one or more adjustable tools in the cutter head with the adjustable tools being adjustable remotely, enabling the adjustment to take place without the necessity of the machine tool being removed from the work piece.

What is claimed is:

1. A machine tool comprising tool support means, a rotatably driven carriage in which the tool support means is mounted, and a base on which the carriage is supported for rotation, the base being securable to a work piece, the tool support means being capable of receiving a drivably rotatable operating tool for performing operations on a surface of the work piece, means being provided to offset the axis of rotation of the operating tool from the axis of the surface upon which operations are to be performed, wherein the operating tool is arranged to include at least one of a cutting tool and one other operating tool, and includes a tool head having a plurality of cutting tools.

2. A machine tool as claimed in claim 1 in which the operating tool further comprises an outer sleeve secured against rotation in the tool support means, a tool drive shaft rotatably mounted in said outer sleeve, and drive means arranged to rotatably drive said tool drive shaft, the axis of rotation of said tool drive shaft being offset from the longitudinal axis of the said outer sleeve.

3. A machine tool as claimed in claim 1 in which the operating tool further comprises an outer sleeve secured against rotation in a bore of the tool support means, a tool drive shaft rotatably mounted in said outer sleeve, a drive means arranged to rotatably drive said tool drive shaft, the longitudinal axes of the said outer sleeve and the tool drive shaft being co-incident, and the longitudinal axis of said outer sleeve being offset from the longitudinal axis of the bore in the tool support means.

4. A machine tool as claimed in claim 1 in which the operating tool further comprises an outer sleeve secured against rotation in the tool support means, a tool drive shaft mounted in bearing means in the said outer sleeve and drive means arranged to rotatably drive the said tool drive shaft in the said outer sleeve, the axis of rotation of the tool drive shaft being offset from the longitudinal axis of the outer sleeve, the tool support means being rotatable with respect to the carriage, and having tool support drive means to effect rotation of the tool support means with respect to the carriage.

5. A machine tool as claimed in claim 1 in which the said another operating tool comprises a welding head.

6. A machine tool as claimed in claim 1 having said operating tool comprising a plurality of fixed cutting tools and at least one adjustable cutting tool.

7. A machine tool as claimed in claim 1 in which the tool head having a plurality of cutting tools includes a first set of said cutting tools being arranged to cut the first surface of a work piece, and second and third sets of said tools being arranged to cut second and third surfaces of the work piece, the second and third surfaces being adjacent to said first surface.

8. A machine tool as claimed in claim 7 in which at least one of the cutting tools of said first set of cutting tools is adjustable, adjustment means being provided to adjust the position of the said at least one tool from a location remote from the location of the said at least one cutting tool.

9. A machine tool as claimed in claim 1 in which the operating tool has drive means comprising a motor arranged to drive a tool shaft of the operating tool through a gear transmission.

10. A machine tool as claimed in claim 9 in which the gear transmission comprises a double helical gear on the output shaft to the drive motor enmeshed with a corresponding double helical gear attached to the tool drive shaft.

11. A machine tool as claimed in claim 1 in which the carriage has drive means including at least one motor arranged to drive the carriage through a gear transmission.

12. A machine tool as claimed in claim 1 in which the operating tool is axially movable with respect to the tool support means, and includes height adjustment means to translate the operating tool relative to the tool support means.

13. A machine tool as claimed in claim 1 in which the tool support means comprises a first sleeve attached to the rotatable carriage and a second stationary sleeve attached to the base, the first and second sleeves including bearing means for the operating tools.

14. A machine tool comprising tool support means, a rotatably driven carriage in which the tool support means is mounted, and a base on which the carriage is supported for rotation, the base being securable to a work piece, the tool support means being capable of receiving a drivably rotatable operating tool for performing operations on a surface of the work piece, means being provided to offset the axis of rotation of the operating tool from the axis of the surface upon which operations are to be performed, wherein the operating tool includes at least one of a cutting tool, and another operating tool and includes at least one adjustable tool and adjustment means for said at least one adjustable tool, the adjustment means being operable from a location remote from the position of said at least one adjustable tool.

15. A machine tool comprising tool support means, a rotatably driven carriage in which the tool support means is mounted, and a base on which the carriage is supported for rotation, the base being securable to a work piece, the tool support means being capable of receiving a drivably rotatable operating tool for performing operations on a surface of the work piece, means being provided to offset the axis of rotation of the operating tool from the axis of the surface upon which operations are to be performed, wherein the operating tool is arranged to include at least one cutting tool and one other operating tool, and includes one or more adjustable cutting tools, adjustment means comprising a cam having a camming surface contactable by a face on the or each adjustable cutting tool, means forcing said face of the or each cutting tool into contact with the respective camming surface, and a cam operating shaft extending from the cam through the operating tool to a location external of the machine tool.

16. A machine tool comprising tool support means, a rotatably driven carriage in which the tool support means is mounted, and a base on which the carriage is supported for rotation, the base being securable to a work piece, the tool support means being capable of receiving a drivably rotatable operating tool for performing operations on a surface of the work piece, means being provided to offset the axis of rotation of the operating tool from the axis of the surface upon which operations are to be performed, wherein the carriage has drive means comprising two hydraulic motors and a gear transmission between each motor and the carriage.

17. A machine tool comprising tool support means, a rotatably driven carriage in which the tool support means is mounted, and a base on which the carriage is supported for rotation, the base being securable to a work piece, the tool support means being capable of receiving a drivably rotatable operating tool for performing operations on a surface of the work piece, means being provided to offset the axis of rotation of the operating tool from the axis of the surface upon which operations are to be performed, wherein the tool support means comprises a sleeve extending between the driven carriage and a freely rotatable carriage, the driven and freely rotatable carriages being mounted by bearing means in the base, the base extending into a bore of the work piece.

18. A machine tool as claimed in claim 17 in which the base includes clamping means to secure the base in the bore of the work piece.

* * * * *